United States Patent [19]

Vukasovic et al.

[11] 4,066,954

[45] Jan. 3, 1978

[54] FREQUENCY CONVERTER

[75] Inventors: Lovro Vukasovic; Janos Raduka, both of Erlangen, Germany

[73] Assignee: Siemens Aktiengesellschaft, Berlin & Munich, Germany

[21] Appl. No.: 723,548

[22] Filed: Sept. 15, 1976

[30] Foreign Application Priority Data

Sept. 18, 1975 Germany ............................. 2541701

[51] Int. Cl.² ...................... H02M 1/18; H02H 7/122
[52] U.S. Cl. ......................................... 363/37; 363/50
[58] Field of Search ................ 321/4, 11, 12, 13, 45 R

[56] References Cited

U.S. PATENT DOCUMENTS

| 3,569,819 | 3/1971 | Martzloff | 321/4 |
| 3,760,258 | 9/1973 | Percorini | 321/11 |
| 3,882,370 | 5/1975 | McMurray | 321/45 R |
| 3,942,090 | 3/1976 | Matthes et al. | 321/45 R |
| 4,005,350 | 1/1977 | Brenneisen | 321/11 |

FOREIGN PATENT DOCUMENTS 421,088   8/1974   U.S.S.R. ..................................... 321/11

Primary Examiner—William H. Beha, Jr.
Attorney, Agent, or Firm—Kenyon & Kenyon, Reilly, Carr & Chapin

[57] ABSTRACT

A parallel resonant circuit frequency converter, in which, through the resonant circuit voltage picked up by a voltage sensor and the inverter output current picked up by a current sensor, a firing instant for the inverter thyristors is determined prior to every zero crossing of the resonant circuit voltage by means of an evaluating circuit, taking into consideration the commutation and the protection time. To detect commutation short circuits, the currents of bridge arms with a common d-c terminal are measured by the current sensor and added up to an a-c current. The current sensor and the voltage sensor are followed by a monitoring device which releases a pulse if between one of the firing instants and the corresponding zero crossing of the resonant circuit voltage the inverter output current and the resonant circuit voltage remain in phase or are in phase opposition after the zero crossing.

10 Claims, 3 Drawing Figures

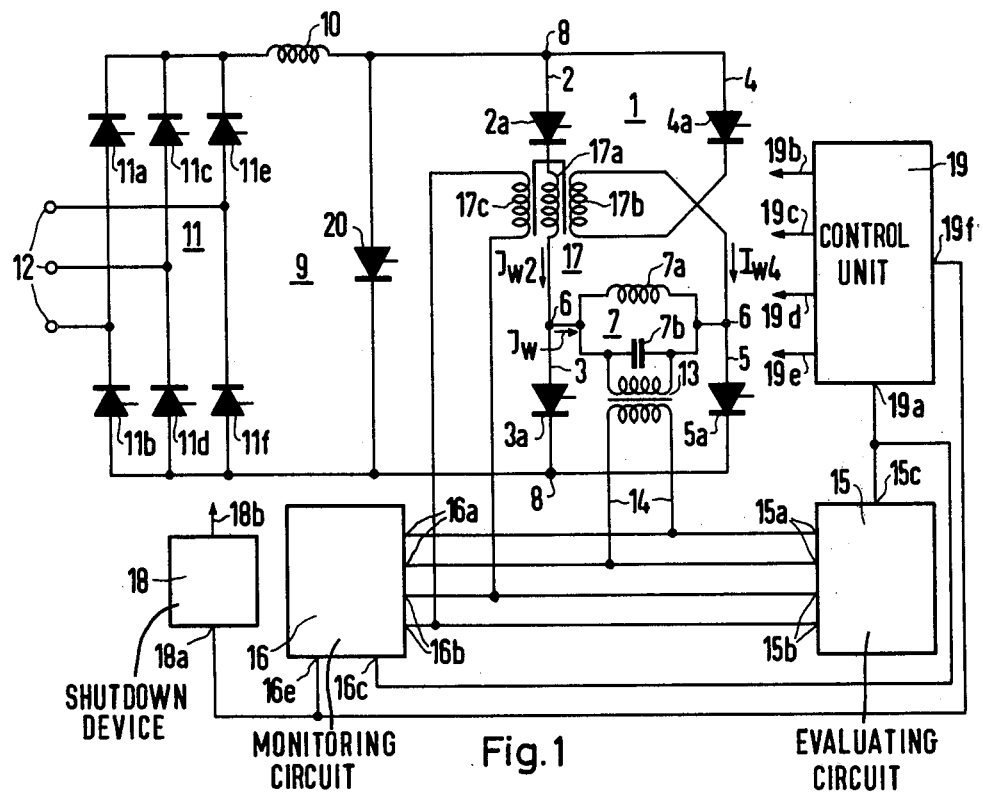
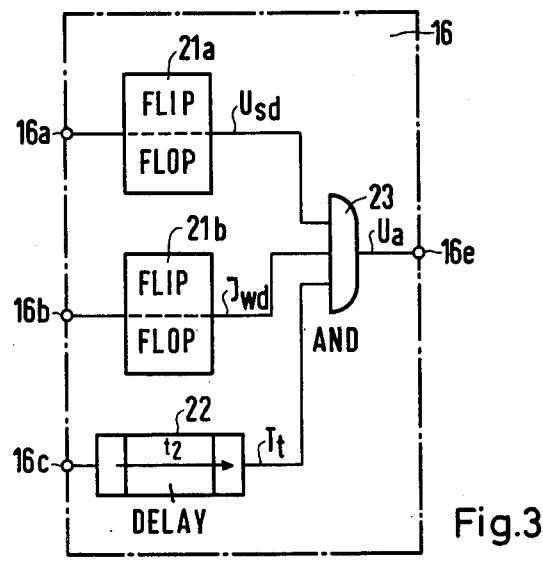
Fig. 1
Fig. 3

FREQUENCY CONVERTER

Background of the Invention

The invention relates to frequency converters in general and more particularly to an improved frequency converter control arrangement.

A known type of frequency converter comprises an inverter with thyristors in a bridge circuit, the a-c outputs of which are connected to a resonant circuit and the d-c inputs of which are connected to an a-c voltage source, via an intermediate d-c link containing a smoothing choke and a controlled rectifier. A voltage sensor is provided for picking up the resonant circuit voltage and a current sensor for picking up the inverter output current. These are followed by an evaluating circuit, the output of which is connected to the control unit for the thyristors of the inverter and which determines through a trigger pulse, prior to every zero crossing of the resonant circuit voltage, a firing instant for thyristors of diagonal bridge arms of the inverter, the position of which depends on the commutation time of the inverter and the protection time of the thyristors.

Such a frequency converter is disclosed in German Offenlegungsschrift 2,008,239. There is described an inverter with a parallel resonant circuit as the load, i.e. what is known as a parallel resonant circuit frequency converter. Frequency converters with a resonant circuit as the load are load controlled in the steady state condition and the operating frequency of the inverter is determined by the resonance frequency of the resonant circuit. The current passes in direct commutation from one bridge arm of the inverter to the one that next carriers current the reactive commutation power being supplied by the capacitor of the parallel resonant circuit. In the known frequency converter, the thyristors of diagonal bridge arms are always fired a short time before the zero crossing of the resonant circuit voltage, which time is determined by the commutation time of the inverter and the protection time of the thyristors. High operating reliability of the frequency converter is thereby achieved. If, however, in such frequency converters, the resonant circuit voltage is not sufficient for commutation or if thyristors of a bridge arm fail, commutation short circuits may result, which can lead to the destruction of thyristors and thereby, to operating failures.

Thus, the need for frequency converters of the type mentioned above in which commutation short circuits can be detected without delay is evident.

SUMMARY OF THE INVENTION

According to the present invention, this problem is solved by providing an arrangement in which the current in bridge arms with a common d-c terminal can be picked up by the current sensor and can be added up to an a-c current, with the current and the voltage sensor followed by a monitoring circuit, at the output of which a pulse is present if, between a firing instant and the corresponding zero crossing of the intermediate link voltage, the inverter output current and the resonant circuit voltage remain in phase or are in phase opposition after the zero crossing.

In the frequency converter according to the present invention, a commutation short circuit is detected within the half wave in which it occurs. Thereby, the frequency converter can be shut down before damage to the thyristors occurs, or any attempt of self-correction can be initiated. It should be emphasized that no separate actual value transmitters are required for detecting commutation short circuits, but that the monitoring and detection is performed with actual value transmitters which are necessary for controlling the frequency converter in normal operation anyway.

Preferably, a current transformer having the connecting lines from bridge arms of the inverter with a common d-c terminal run to its windings so that the current flows through the windings in opposite directions is employed as the current sensor. In this manner, a simple current sensor, which determines the inverter output current by means of the current in the bridge arms is obtained.

It is advantageous to determine the relative phase position of the resonant circuit voltage and the inverter output current in the monitoring circuit only after a predetermined time interval referred to the firing instant, has passed. This time period may be longer than the commutation and protection time.

BRIEF DESCRIPTION OF THE DRAWINGS

FIG. 1 is a block-circuit diagram of a frequency converter according to the present invention;

FIG. 3 is a logic diagram of a portion of the circuit of FIG. 1.

DETAILED DESCRIPTION OF THE INVENTION

Figure 2:
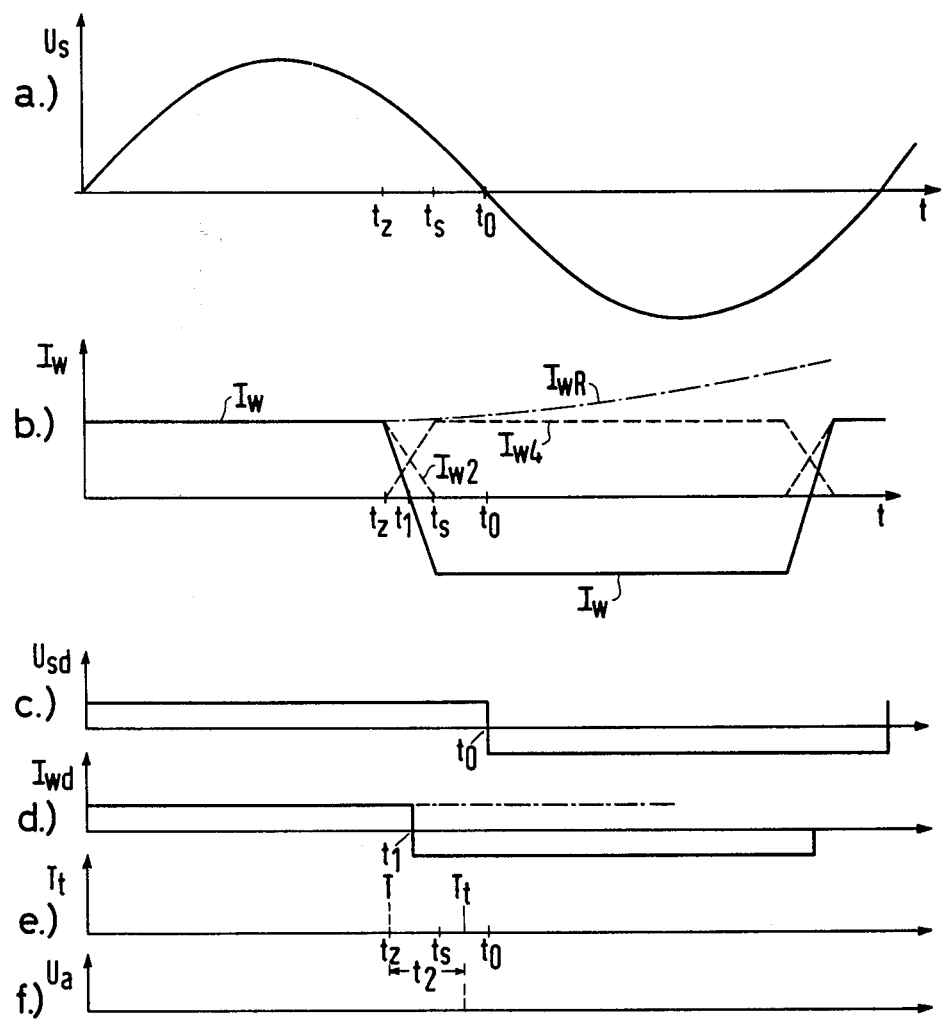
FIG. 2 is a wave form diagram helpful in understanding the operation of the frequency converter of FIG. 1.

FIG. 1 shows the circuit diagram of a frequency converter according to the present invention. An inverter 1 is constructed from thyristors in a single phase bridge circuit, a thyristor $2a$ to $5a$ being arranged in the embodiment in each bridge arm 2 to 5. A parallel resonant circuit 7, which consists of a choke $7a$ and a capacitor $7b$ in parallel, is fed via the a-c outputs 6 of the inverter 1 as the load. It should be pointed out that any load-controlled frequency converter is suited as the frequency according to the present invention, and in particular, the resonant circuit can also be a series resonant circuit. The d-c terminals 8 of the inverter 1 are connected, via an intermediate d-c link 9 containing a smoothing choke 10 and a rectifier 11, to a three phase network, which is connected to the terminals 12. The rectifier 11 is constructed from thyristors $11a$ to $11f$ in a three phase bridge circuit.

A transformer 13 is provided as the voltage sensor for determining the resonant circuit voltage, in the illustrated embodiment. The primary winding of transformer 13 is connected to the two electrodes of the capacitor $7b$, and the secondary winding is connected via lines 14 to the input $15a$ of an evaluating circuit 15 and via inputs $16a$ to a monitoring circuit 16. A current transformer 17 has one primary winding $17a$ connected into the bridge arms 2 and is used as the current sensor. A second primary winding $17b$ is disposed in the bridge arm 4. The connecting lines brought to the winding $17b$ cross over so that the current flows through the two windings $17a$ and $17b$ in opposite directions. Thus, the inverter output current $I_w$ is determined by the two bridge arm currents $I_{w2}$ and $I_{w4}$, which add up to an a-c current in the windings $17a$ and $17b$ because of the opposite current flow. The secondary winding $17c$ of the current transformer 17 is connected to a second input $15b$ of the evaluating circuit 15 and to a second input $16b$ of the monitoring circuit 16.

A circuit such as is described, for instance, in the German Offenlegungsschrift 2,008,239 can be used as the evaluating circuit 15. With this circuit, a firing instant for the thyristors of diagonal bridge arms 2 and 5 or 3 and 4 is fixed by a trigger pulse, the position in time of the firing instant being determined by the commutation and the protection time. The output 15c, at which the trigger pulses are present, is connected to a trigger input 19a of a control unit 19 for the thyristors 2a to 5a of the inverter 1. The control inputs 19b to 19e for the thyristors, which are only suggested in FIG. 1, are connected to the firing electrodes of the thyristors 2a to 5a. A control unit for instance, such as is described in the book by D. Ernst and D. Stroele, "Industrieelektronik," Springer-Verlag, 1973, pages 54 and 55 can be used as the control unit 19. A control unit must also be provided for the thyristors 11a to 11f of the rectifier 11; it is not shown in FIG. 1 in order to preserve the clarity of the presentation. Such a control unit is known, for instance, form the book by G. Moeltgen, "Line Commutated Thyristor Converters," Siemens AG, Pitman Publishing, London, 1972, pages 301 to 307. Beside the actual-value transmitters 13 and 17, current transformers for controlling the inverter must also be provided in the feed line of the rectifier 11; they are not shown either in FIG. 1.

The monitoring circuit 16 has a third input 16c, which is connected to the output 15c of the evaluating circuit 15. Furthermore, the monitoring device 16 has an output 16e, which is brought to a disabling input 19f of the control unit 19. By means of this disabling input 17f, the firing pulses of the control unit 19 can be disabled for one half wave of the resonant circuit voltage $U_s$. The output 16e of the monitoring device 16 is furthermore connected to an input 18a of a shutdown device 18 for the inverter. An output 18b of the shutdown device 18, which is only indicated in FIG. 1, is connected to the firing electrode of a thyristor 20, which is shunted across the d-c terminals 8 of the inverter 1. In addition, the shutdown device 18 can actuate a switch, by which the current supply to the inverter can be interrupted. This switch is not shown in FIG. 1.

The operation of the monitoring circuit 16, the design of which will be explained in further detail below, will now be discussed in connection with the wave forms 21 of FIG. 2. In FIG. 2, the resonant circuit voltage $U_s$, the inverter output current $I_w$, the bridge arm currents $I_{w2}$ and $I_{w4}$, the current $I_{wk}$, which occurs in the event of a commutation short circuit, and digital signals $U_{sd}$, $I_{wd}$, $T_t$ and $U_a$ are plotted versus time $t$. The bridge arm currents $I_{w2}$ and $I_{w4}$ are shown on wave form b as dashed lines and the commutation short circuit current as a dash-dotted line. It is assumed in the following that the thyristors 2a and 5a in the bridge arms 2 and 5 carry current. The resonant circuit voltage $U_s$ and the resonant circuit current $I_w$ and the signals $U_{sd}$ and $I_{wd}$ derived from these variables are now in phase or positive. At the time $t_z$, the thyristors 3a and 4a of the bridge arms 3 and 4, which carry current next, are fired, the firing instant $t_z$ being determined by a trigger pulse T of the evaluating circuit 15. Now the bridge arm current $I_{w2}$ begins to commutate off and the bridge arm current $I_{w4}$ on. During the commutation or overlap time, the sign of the inverter output current $I_w$ and therefore, also of the signal $I_{wd}$ changes at the time $t_1$. At the time $t_s$, the voltage of the capacitor 7b appears as a negative cut-off voltage at the thyristors 2a and 5a; these are extinguished and the commutation is concluded. The inverter output current $I_w$ has now reached its negative peak value. At the time $t_0$ the resonant circuit voltage $U_s$ passes through zero and changes its sign together with the signal $U_{sd}$. Now, positive voltage is again present at the extinguished thyristors 2 and 5. The time interval $t_z$ to $t_s$, which corresponds to the commutation time of the converter, and the time interval between the time $t_s$ to $t_0$, which corresponds to the protection time, and must be at least equal to the recovery time of the thyristors, are set by the evaluating circuit 15. If the resonant circuit voltage $U_s$ is insufficient for commutating to the bridge arms 3 and 4 which carry current next, or if thyristors in the bridge arms 2 and 5 are defective, then no commutation takes place and current flows through the bridge arms 2 and 3 or 4 and 5, i.e., a commutation short circuit is present. The current $I_w$ is now not reversed, but increases with the same flow direction as a short circuit current $I_{wk}$. Thus, the signal $I_{wd}$ also retains its sign. Up to the time $t_o$, the resonant circuit voltage $U_s$ and the sensed inverter output current $I_w$ are therefore in phase and become opposite in phase only after the time $t_o$. A commutation short circuit can therefore be detected by determining whether or not the resonant circuit voltage $U_s$ and the inverter output current $I_w$ are in phase before the zero crossing of the resonant circuit voltage $U_s$ and are in phase opposition after the zero crossing.

In the monitoring device, the relative phase of the inverter output current and the resonant circuit voltage in the time interval between $t_z$ and $t_o$ or after the time $t_o$ is interrogated and a pulse is delivered if the two signals remain in phase prior to the time $t_0$ or are in phase opposition after the time $t_o$. For this purpose, the phase in the case of the signals $U_{sd}$ and $I_{wd}$, which are plotted as wave forms c and d, can be interrogated by an interrogation pulse $T_t$, which is shifted relative to the trigger pulse T by a time span $t_2$. If a commutation short circuit is present, a shutdown pulse $U_a$, which is shown with a dash-dotted line on wave form f, appears at the output 16e. The time span $t_2$ can end before the time $t_0$ or after the time $t_0$. The time span $t_2$ should not be chosen longer than one-quarter of the period at operating frequency, however. It should be emphasized in this connection that the relative phase can, of course, also be checked continously during the entire time interval between $t_z$ and $t_0$ or during a time interval which goes beyond $t_0$, in order to ascertain short circuits.

A self correction of the inverter can be initiated with the shutdown pulse $U_a$ via the blocking input 19f of the control unit 19. To accomplish this the firing pulses must be blocked during a half wave of the resonant circuit voltage $U_s$. Subsequently, the previously already fired thyristors are again fired. If the resonant circuit voltage is now sufficient for commutation, normal operation can be continued. However, it is often necessary to switch off the inverter 1 immediately in the event of a commutation short circuit to protect the thyristors. The shutdown device 18 which short-circuits the inverter 1 by firing the thyristor 20 is suited for this purpose. The energy stored in the smoothing choke 10 can now flow off and the frequency converter can subsequently be switched off. This shutting down is necessary particularly if several frequency converters are operated in parallel, since with such parallel operation the danger of destruction of thyristors of the inverter, in which a commutation short circuit occurs, is particularly great.

An example of a monitoring circuit 16 is shown in FIG. 3. This embodiment provided the pulses of wave forms c to f of FIG. 2. It should be emphasized again that, deviating from this embodiment continuous monitoring of the relative phase before and after the zero crossing at the time $t_o$ is also possible. In FIG. 3, the input 16a of the monitoring device 16 is coupled to a first bistable multivibrator i.e. a flip flop, 21a which triggers on each zero crossing at its input. Since the input 16a is connected to the voltage detector 13, the signal $U_{sd}$ appears at the output of the bistable multivibrator 21a. The input 16b, which is connected to the current sensor 17, is coupled to a second bistable multivibrator 21b, which also trigger on a zero crossing at its input. At the output of bistable multivibrator 21b, therefore, the signal $I_{wd}$ is present. The output 15c of the evaluating circuit 15 is connected to the input 16c, which is coupled to a delay device 22, which delays the trigger pulse T by the delay time $t_2$. The output signal of the delay device 22 is therefore the pulse $T_t$. The outputs of the bistable multivibrators 21a and 21b and of the delay device 22 are fed to an AND gate 23, the output of which is connected to the output 16e of the monitoring circuit 16. A signal $U_a$ is obtained at the output of the AND gate, if the condition $$U_a = U_{sd} \cdot I_{wd} \cdot T_t$$

is fulfilled. Such occurs when the resonant circuit voltage $U_s$ and the inverter output current $I_w$ are in phase at the time of the pulse $T_t$. This indicates a commutation short circuit prior to the zero crossing at the time $t_o$ i.e. the condition shown in dash dot lines on the wave forms b, d and f of FIG. 2. If the commutation short circuit is to be interrogated only after the time $t_o$, the signal $U_{sd}$ or $I_{wd}$ must be inverted.

What is claimed is:

1. In a frequency converter comprising an inverter with thyristors in a bridge circuit, the a-c outputs of which are connected to a resonant circuit and the d-c inputs of which are connected to an a-c voltage source, via an intermediate d-c link with a smoothing choke and a controlled rectifier and having a voltage sensor for determining the resonant circuit voltage and a current sensor for determining the inverter output current, the outputs of which are inputs to evaluating circuit, the output of which is connected to the control unit for the thyristors of the inverter, which evaluating circuit determines by means of a trigger pulse, prior to every zero crossing of the resonant circuit voltage, a firing instant for thyristors of diagonal bridge arms of the inverter, the position of which depends on the commutation time of the inverter and the protection time of the thyristors, the improvement comprising:

a. the current sensor being one which measures and adds up to an ac current the currents in bridge arms with a common d-c terminal; and
    b. a monitoring circuit having as inputs the outputs of the current and the voltage sensor and developing at its output a pulse if, between a firing instant ($t_z$) and the corresponding zero crossing ($t_o$) of the resonant circuit voltage, the inverter output current and the resonant circuit voltage remain in phase or developing said pulse if said current and voltage are in phase opposition after the zero crossing.

2. The improvement according to claim 1, wherein said current sensor comprises a current transformer having primary windings coupled to the bridge arms of the inverter with a common d-c terminal, said windings coupled such that the current flows through the windings in opposite directions.

3. The improvement according to claim 1 and further including means for shutting down the inverter having its input coupled to the output of the monitoring circuit.

4. The improvement according to claim 1 wherein the output of the monitoring circuit is connected to a disabling input of the control unit of the inverter.

5. The improvement according to claim 1 wherein said monitoring circuit includes means for determining the relative phase of the resonant circuit voltage and the inverter output current only after the end of a predetermined time span, referred to the firing instant.

6. The improvement according to claim 5, wherein said time span is longer than the commutation and the protection time of the thyristors of said inverter.

7. The improvement according to claim 2 and further including means for shutting down the inverter having its input coupled to the output of the monitoring circuit.

8. The improvement according to claim 7 wherein the output of the monitoring circuit is connected to a disabling input of the control unit of the inverter.

9. The improvement according to claim 8 wherein said monitoring circuit includes means for determining the relative phase of the resonant circuit voltage and the inverter output current only after the end of a predetermined time span, referred to the firing instant.

10. The improvement according to claim 4 wherein said monitoring circuit includes means for determining the relative phase of the resonant circuit voltage and the inverter output current only after the end of a predetermined time span, referred to the firing instant.

* * * * *